(12) United States Patent
Norman

(10) Patent No.: US 7,643,500 B1
(45) Date of Patent: Jan. 5, 2010

(54) OVERHEAD REPLICATION FOR SONET SIGNALS

(75) Inventor: Charles W. Norman, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1197 days.

(21) Appl. No.: 10/647,936

(22) Filed: Aug. 26, 2003

Related U.S. Application Data

(63) Continuation-in-part of application No. 09/899,583, filed on Jul. 6, 2001, which is a continuation of application No. 09/085,539, filed on May 26, 1998, now abandoned, which is a continuation of application No. 08/731,818, filed on Oct. 22, 1996, now abandoned.

(51) Int. Cl.
*H04L 12/28* (2006.01)
*H04J 3/04* (2006.01)

(52) U.S. Cl. .................... 370/406; 370/536

(58) Field of Classification Search ............. None
See application file for complete search history.

(56) References Cited

U.S. PATENT DOCUMENTS

| | | | |
|---|---|---|---|
| 4,213,201 A | 7/1980 | Gagnier et al. | |
| 5,040,170 A | 8/1991 | Upp et al. | |
| 5,159,595 A | 10/1992 | Flanagan et al. | |
| 5,179,548 A | 1/1993 | Sandesara | |
| 5,185,736 A | 2/1993 | Tyrrell et al. | |
| 5,218,604 A | 6/1993 | Sosnosky | |
| 5,307,353 A | 4/1994 | Yamashita et al. | |
| 5,315,594 A | 5/1994 | Noser | |
| 5,327,427 A | 7/1994 | Sandesara | |
| 5,341,364 A | 8/1994 | Marra et al. | |
| 5,343,464 A | 8/1994 | Lino et al. | |
| 5,365,518 A | 11/1994 | Noser | |
| 5,390,164 A | 2/1995 | Kremer | |
| 5,406,401 A | 4/1995 | Kremer | |
| 5,416,768 A | 5/1995 | Jahromi | |
| 5,416,772 A | 5/1995 | Helton et al. | |
| 5,440,540 A | 8/1995 | Kremer | |
| 5,448,389 A | 9/1995 | Peacock | |
| 5,465,252 A | 11/1995 | Muller | |
| 5,471,476 A | 11/1995 | Hiramoto | |
| 5,473,611 A | 12/1995 | Gilboa et al. | |
| 5,506,956 A | 4/1996 | Cohen | |
| 5,526,344 A | 6/1996 | Diaz et al. | |
| 5,546,403 A | 8/1996 | Yamamoto et al. | |
| 5,550,805 A | 8/1996 | Takatori et al. | |
| 5,555,477 A | 9/1996 | Tomooka et al. | |
| 5,577,196 A | 11/1996 | Peer | |
| 5,600,648 A | 2/1997 | Furuta et al. | |
| 5,638,356 A | 6/1997 | Hijikata | |
| 5,663,949 A | 9/1997 | Ishibashi et al. | |
| 5,754,528 A | 5/1998 | Uchida | |
| 5,857,092 A | 1/1999 | Nakamura et al. | |
| 5,896,378 A | 4/1999 | Barker | |
| 5,905,585 A | 5/1999 | Shirai | |
| 6,011,802 A | 1/2000 | Norman | |

*Primary Examiner*—Steven H Nguyen

(57) ABSTRACT

A communication system comprises a first interface system and a second interface system. The first interface system receives a SONET signal including section overhead and line overhead in a transport overhead and including path overhead and user data in a payload. In response, the first interface system transfers the section overhead, line overhead, path overhead, and user data. The second interface system receives the section overhead, line overhead, path overhead, and user data. In response, the second interface system regenerates the SONET signal including the section overhead and line overhead in the first transport overhead and including the path overhead and user data in the payload. The second interface system transfers the regenerated SONET signal.

18 Claims, 6 Drawing Sheets

U.S. PATENT DOCUMENTS

| | | | |
|---|---|---|---|
| 6,169,754 B1 * | 1/2001 | Sugawara et al. | 370/535 |
| 6,295,615 B1 | 9/2001 | Cohen | |
| 6,404,525 B1 * | 6/2002 | Shimomura et al. | 398/82 |
| 6,477,178 B1 * | 11/2002 | Wakim et al. | 370/466 |
| 6,532,320 B1 * | 3/2003 | Kikuchi et al. | 398/88 |
| 6,559,989 B1 * | 5/2003 | Kim et al. | 398/101 |
| 7,006,536 B1 * | 2/2006 | Somashekhar et al. | 370/538 |
| 7,106,968 B2 * | 9/2006 | Lahav et al. | 398/47 |
| 7,239,649 B2 * | 7/2007 | Takeguchi et al. | 370/473 |
| 2001/0030784 A1 * | 10/2001 | Urashita | 359/124 |
| 2002/0103926 A1 * | 8/2002 | Cook et al. | 709/236 |
| 2003/0198471 A1 * | 10/2003 | Ovadia | 398/47 |
| 2004/0170165 A1 * | 9/2004 | Maciocco et al. | 370/389 |
| 2004/0177169 A1 * | 9/2004 | Abbas et al. | 710/1 |
| 2004/0208544 A1 * | 10/2004 | Ovadia | 398/47 |

\* cited by examiner

OVERHEAD REPLICATION FOR SONET SIGNALS

RELATED APPLICATIONS

This U.S. Patent Application is a continuation-in-part of U.S. patent application Ser. No. 09/899,583, entitled "METHOD AND SYSTEM FOR TRANSPORTING A SECONDARY COMMUNICATION SIGNAL WITH A PRIMARY COMMUNICATION SIGNAL", and filed on Jul. 6, 2001; which is a continuation of U.S. patent application Ser. No. 09/085,539, entitled "METHOD AND SYSTEM FOR TRANSPORTING A SECONDARY COMMUNICATION SIGNAL WITH A PRIMARY COMMUNICATION SIGNAL", and filed on May 26, 1998 now abandoned; which is a continuation of U.S. patent application Ser. No. 08/731,818, entitled "METHOD AND SYSTEM FOR TRANSPORTING A SECONDARY COMMUNICATION SIGNAL WITH A PRIMARY COMMUNICATION SIGNAL", and filed on Oct. 22, 1996 now abandoned. U.S. patent application Ser. No. 09/899,583 is hereby incorporated by reference into this U.S. Patent Application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the regeneration of SONET signals to replicate original section and line overhead.

2. Description of the Prior Art

Synchronous Optical Network (SONET) nodes transfer user data in frames. The SONET frames include overhead information in addition to the user data. The SONET nodes alter the overhead information in the SONET frames during transfer. Between two SONET nodes, it may be desired to leave the SONET overhead unaltered. Unfortunately, this requires installing a direct optical fiber link between the two SONET nodes, so that there are not any intervening SONET nodes to alter the overhead information. This problem becomes acute when a SONET ring needs to be closed by connecting the two SONET nodes, but installing a direct optical fiber link between the two SONET nodes is too costly.

SUMMARY OF THE INVENTION

Some examples of the invention help solve the above problem with a communication system and method of operation. In some examples of the invention, the communication system comprises a first interface system and a second interface system. The first interface system is configured to receive a first Synchronous Optical Network (SONET) signal including first section overhead and first line overhead in a first transport overhead and including path overhead and user data in a first payload, and in response, to transfer the first section overhead, the first line overhead, the path overhead, and the user data. The second interface system is configured to receive the first section overhead, the first line overhead, the path overhead, and the user data, and in response, to regenerate the first SONET signal including the first section overhead and the first line overhead in the first transport overhead and including the path overhead and the user data in the first payload, and to transfer the regenerated first SONET signal.

BRIEF DESCRIPTION OF THE DRAWINGS

The same reference number represents the same element on all drawings.

DETAILED DESCRIPTION OF THE PREFERRED EMBODIMENT

Figure 1:
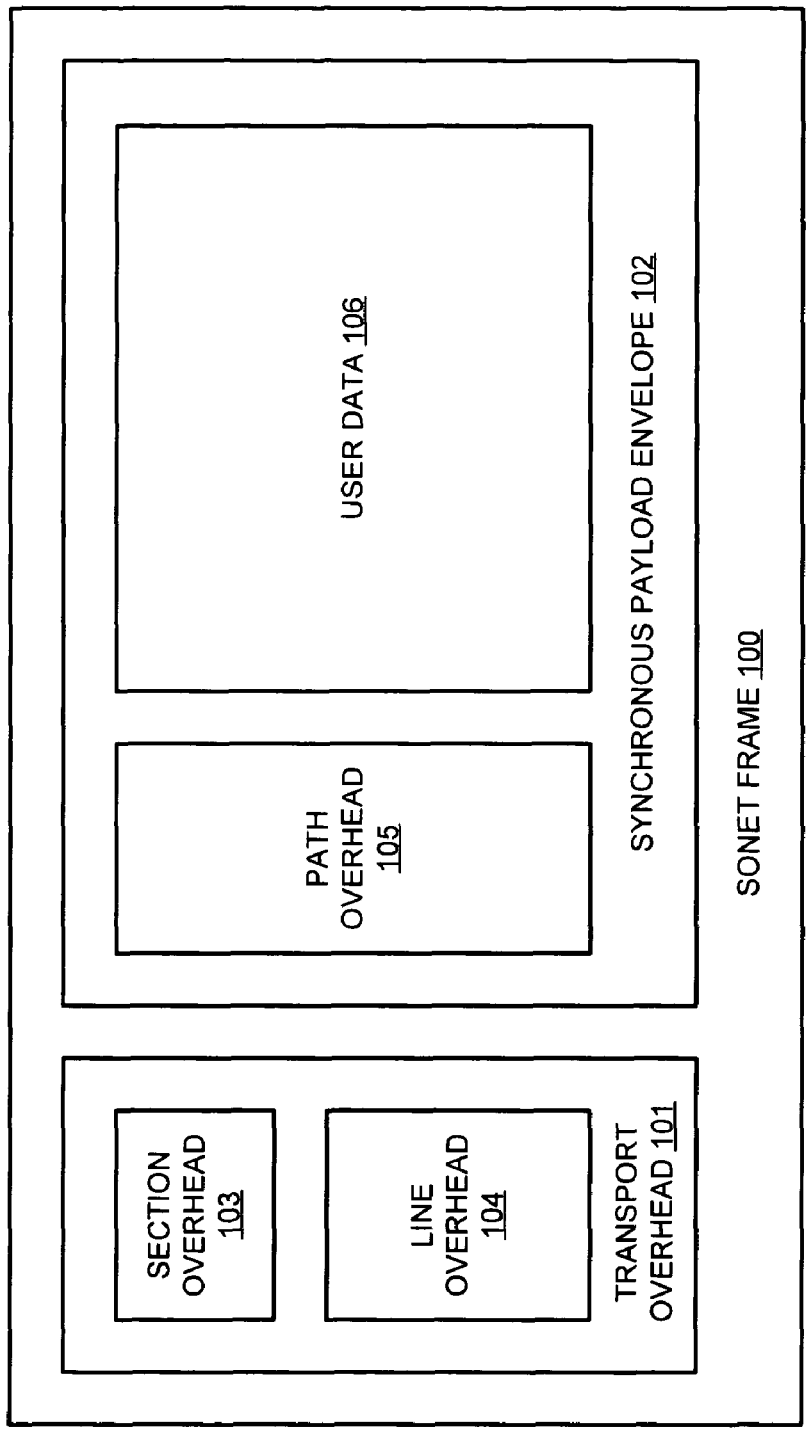
FIG. 1 illustrates a SONET frame in an example of the prior art.
Figure 2:
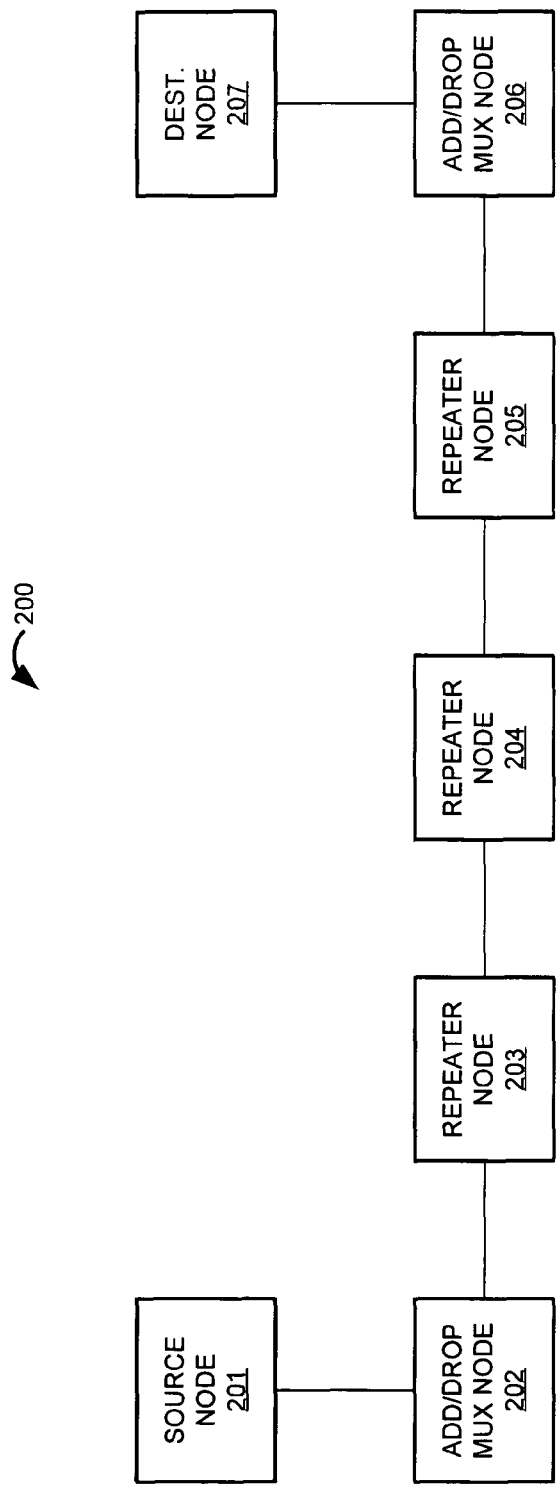
FIG. 2 illustrates a communication system in an example of the prior art.

Prior Communication System—FIGS. 1-2

A brief discussion of a prior communication system is first provided to facilitate a better understanding of the invention. FIG. 1 illustrates SONET frame 100 in an example of the prior art. SONET frame 100 includes transport overhead 101 and synchronous payload envelope 102. Transport overhead 101 includes section overhead 103 and line overhead 104. Synchronous payload envelope 102 includes path overhead 105 and user data 106.

SONET frame 100 has 810 bytes arranged in 90 columns of 9 rows. Section overhead 103 is comprised of nine bytes that are located in rows 1-3 of columns 1-3 of SONET frame 100. Line overhead is comprised of 18 bytes that are located in the remaining rows 4-9 of columns 1-3 of SONET frame 100. Thus, transport overhead 101 comprises rows 1-9 of columns 1-3 of SONET frame 100.

Line overhead 105 includes pointers to the beginning of synchronous payload envelope 102. As indicated by the pointers, one synchronous payload envelope may end and another may begin at various points in SONET frame 100 after transport overhead 101. Path overhead 105 is comprised of nine bytes that are located in rows 1-9 of the first column of the synchronous payload envelope 102. Synchronous payload envelope 102 also carries user data 106. The following tables illustrate the location and content of the SONET overhead bytes.

| | SONET FRAME | | | |
| --- | --- | --- | --- | --- |
| | TRANSPORT OVERHEAD | | | PAYLOAD |
| ROW | COL. 1 | COL. 2 | COL. 3 | COL. 1 |
| 1 | A1 | A2 | J0 | J1 |
| 2 | B1 | E1 | F1 | B3 |
| 3 | D1 | D2 | D3 | C2 |
| 4 | H1 | H2 | H3 | H4 |
| 5 | B2 | K1 | K2 | G1 |
| 6 | D4 | D5 | D6 | F2 |
| 7 | D7 | D8 | D9 | Z4 |

-continued

SONET FRAME

| ROW | TRANSPORT OVERHEAD | | | PAYLOAD |
| --- | --- | --- | --- | --- |
|  | COL. 1 | COL. 2 | COL. 3 | COL. 1 |
| 8 | D10 | D11 | D12 | Z5 |
| 9 | S1/Z1 | Z3 | E2 | Z6 |

SONET OVERHEAD

| TYPE | BYTE | DESCRIPTION |
| --- | --- | --- |
| SECTION | A1 | Framing that marks beginning of frame |
| SECTION | A2 | Framing that marks beginning of frame |
| SECTION | J0 | Trace message to verify connectivity between nodes |
| SECTION | B1 | Parity for frame |
| SECTION | E1 | Orderwire - voice channel for use between nodes |
| SECTION | F1 | Proprietary user channel |
| SECTION | D1 | OAM&P data for control, configuration, monitoring, alarms, etc. |
| SECTION | D2 | OAM&P data for control, configuration, monitoring, alarms, etc. |
| SECTION | D3 | OAM&P data for control, configuration, monitoring, alarms, etc. |
| LINE | H1 | Payload pointer that points to beginning of payload |
| LINE | H2 | Payload pointer that points to beginning of payload |
| LINE | H3 | Frequency justification byte |
| LINE | B2 | Parity for frame |
| LINE | K1 | Automatic protection switching control and alarms |
| LINE | K2 | Automatic protection switching control and alarms |
| LINE | D4 | OAM&P data for control, configuration, monitoring, alarms, etc. |
| LINE | D5 | OAM&P data for control, configuration, monitoring, alarms, etc. |
| LINE | D6 | OAM&P data for control, configuration, monitoring, alarms, etc. |
| LINE | D7 | OAM&P data for control, configuration, monitoring, alarms, etc. |
| LINE | D8 | OAM&P data for control, configuration, monitoring, alarms, etc. |
| LINE | D9 | OAM&P data for control, configuration, monitoring, alarms, etc. |
| LINE | D10 | OAM&P data for control, configuration, monitoring, alarms, etc. |
| LINE | D11 | OAM&P data for control, configuration, monitoring, alarms, etc. |
| LINE | D12 | OAM&P data for control, configuration, monitoring, alarms, etc. |
| LINE | S1/Z1 | Synchronization status (S1) and growth (Z1) |
| LINE | Z3 | Growth |
| LINE | E2 | Orderwire - voice channel for use between nodes |
| PATH | J1 | Trace message to verify connectivity between nodes |
| PATH | B3 | Parity for frame |
| PATH | C2 | Payload type indicator |
| PATH | H4 | Multi-frame indicator for payload containers |
| PATH | G1 | Path status indication from terminating node to originating node |
| PATH | F2 | Proprietary channel |
| PATH | Z4 | Growth |
| PATH | Z5 | Growth |
| PATH | Z6 | Growth |

FIG. 2 illustrates communication system 200 in an example of the prior art. Communication system 200 includes nodes 201-207. Source node 201 is coupled to Add/Drop Multiplexer (ADM) node 202. ADM node 202 is coupled to repeater node 203. Repeater node 203 is coupled to repeater node 204, and repeater node 204 is coupled to repeater node 205. Repeater node 205 is coupled to ADM node 206. ADM node 206 is coupled to destination node 207.

Overhead termination entails the interpretation and processing of incoming overhead bytes, and the generation and transfer of outgoing overhead bytes. Source node 201 and destination node 207 are Path Termination Elements (PTEs) because they terminate the path overhead in the SONET frames. Thus, source node 201 and destination 207 exchange their own end-to-end path overhead. Nodes 201-202 and 206-207 are Line Termination Elements (LTEs) because they terminate the line overhead in the SONET frames. Thus, the ADM nodes 202 and 206 exchange line overhead with one another and with source node 201 and destination node 207. All nodes 201-207 are Section Termination Elements (STEs) because they all terminate the section overhead in the SONET frames. Thus, the all nodes 201-207 exchange section overhead with their neighbor nodes.

In operation, source node 201 transfers SONET frames to ADM node 202. ADM node 202 terminates the line and section overhead and transfers corresponding SONET frames to repeater node 203 that have a different line and section overhead than the SONET frames received by ADM node 202. Repeater node 203 terminates the section overhead and transfers corresponding SONET frames to repeater node 204 that have a different section overhead than the SONET frames received by repeater node 203. Repeater node 204 terminates the section overhead and transfers corresponding SONET frames to repeater node 205 that have a different section overhead than the SONET frames received by repeater node 204. Repeater node 205 terminates the section overhead and transfers corresponding SONET frames to ADM node 206 that have a different section overhead than the SONET frames received by repeater node 205. ADM node 206 terminates the line and section overhead and transfers corresponding SONET frames to destination node 207 that have a different line and section overhead than the SONET frames received by ADM node 206.

Note that the SONET frames transferred by source node 201 differ from the SONET frames received by destination node 207 because the line and section overhead are terminated in transit.

Consider a situation where source node 201 and destination node 207 are in a first communication service provider, but nodes 202-206 are in a second communication service provider. The first communication service provider (nodes 201, 207) may use the second service provider (nodes 202-206) to connect source node 201 to source node 207. Unfortunately, nodes 202-206 alter the line and section overhead between source node 201 and destination node 207. This overhead alteration may not be desirable to the first communication service provider, especially if the second service provider is being used to close a SONET ring for the first service provider.

New Communication System—FIGS. 3-6

FIGS. 3-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

Figure 3:
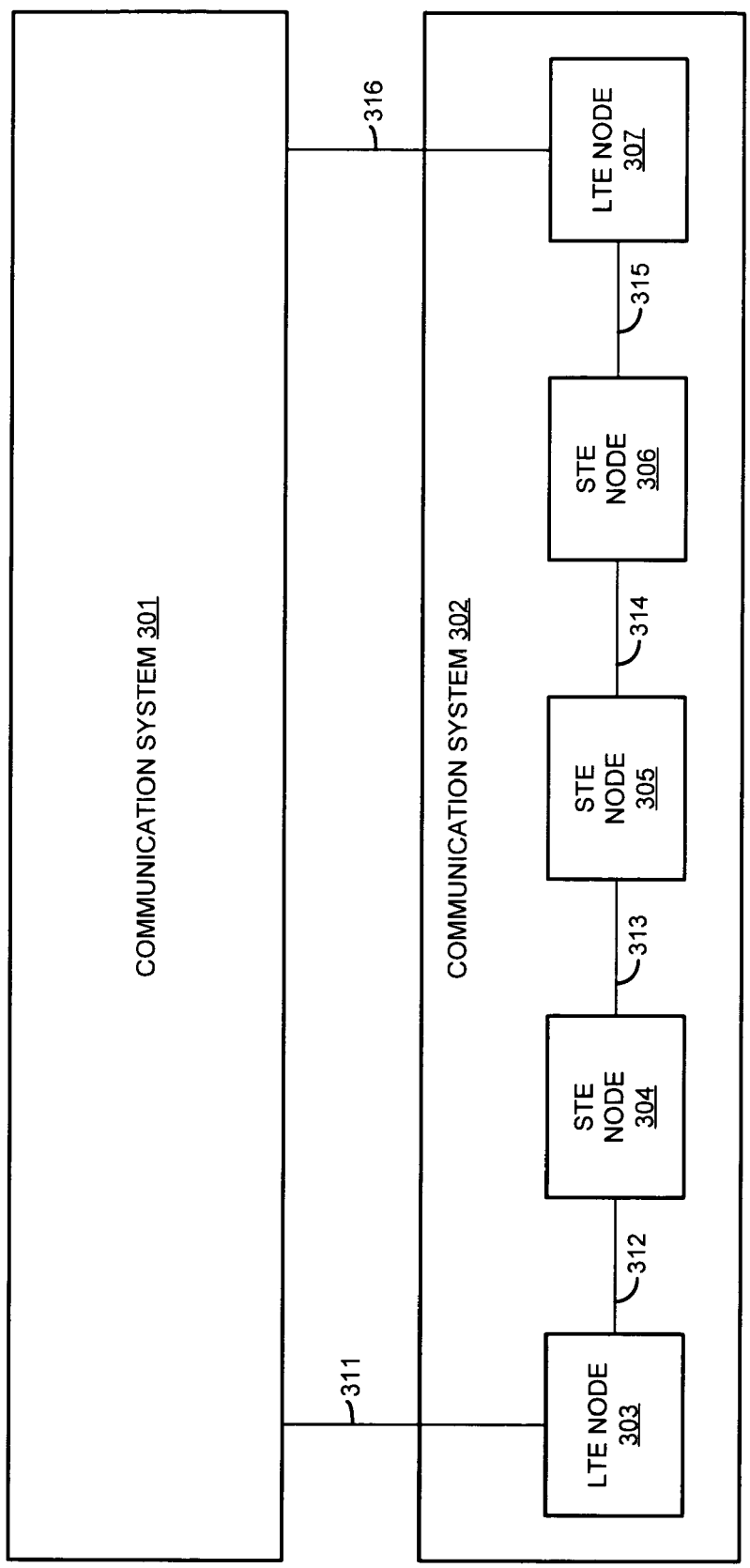
FIG. 3 illustrates a communication system in an example of the invention.

FIG. 3 illustrates communication system 302 in an example of the invention. Communication system 302 includes LTE nodes 303 and 307 and STE nodes 304-306. LTE node 303 is coupled to communication system 301 over link 311. LTE node 303 is coupled to STE node 304 over link 312. STE node 304 is coupled to STE node 305 over link 313, and STE node 305 is coupled to STE node 306 over link 314. STE node 306 is coupled to LTE node 307 over link 315. LTE node 307 is coupled to communication system 301 over link 316.

The term "STE node" indicates a node that terminates section overhead, but does not terminate path overhead or line overhead. The term "LTE node" indicates a node that terminates line overhead and section overhead, but that does not terminate path overhead. The term "PTE node" indicates a node that terminates path overhead, line overhead, and section overhead.

LTE nodes 303 and 307 could be ADMs, cross-connects, or some other elements that terminate line overhead and section overhead. STE nodes 304-306 could be repeaters, amplifiers, or some other elements that terminate section overhead. Communication system 301 may include its own PTE nodes, LTE nodes, and STE nodes.

Communication system 301 transfers SONET frames to LTE node 303 over link 311. LTE node 303 terminates the line and section overhead in these SONET frames. LTE node 303 transfers corresponding SONET frames to STE node 304 over link 312. Note that these corresponding SONET frames have new line and section overhead in their transport overhead, but these corresponding SONET frames also include the original line and section overhead that was terminated by LTE node 303 in their payload.

STE node 304 terminates the section overhead and transfers corresponding SONET frames over link 313 to STE node 305, and these corresponding SONET frames also include the original line and section overhead in the payload. STE node 305 terminates the section overhead and transfers corresponding SONET frames over link 314 to STE node 306, and these corresponding SONET frames also include the original line and section overhead in the payload. STE node 306 terminates the section overhead and transfers corresponding SONET frames over link 315 to LTE node 307, and these corresponding SONET frames also include the original line and section overhead in the payload.

LTE node 307 terminates the line and section overhead and transfers SONET frames over link 316 to communication system 301. LTE node 307 places the original line and section overhead back in the transport overhead of the SONET frames transferred back to communication system 301. Thus, the SONET frames transferred to communication system 301 replicate the section and line overhead of the SONET frames received from communication system 301. These SONET frames also have the same path overhead and user data which remained unchanged by communication system 302.

Figure 4:
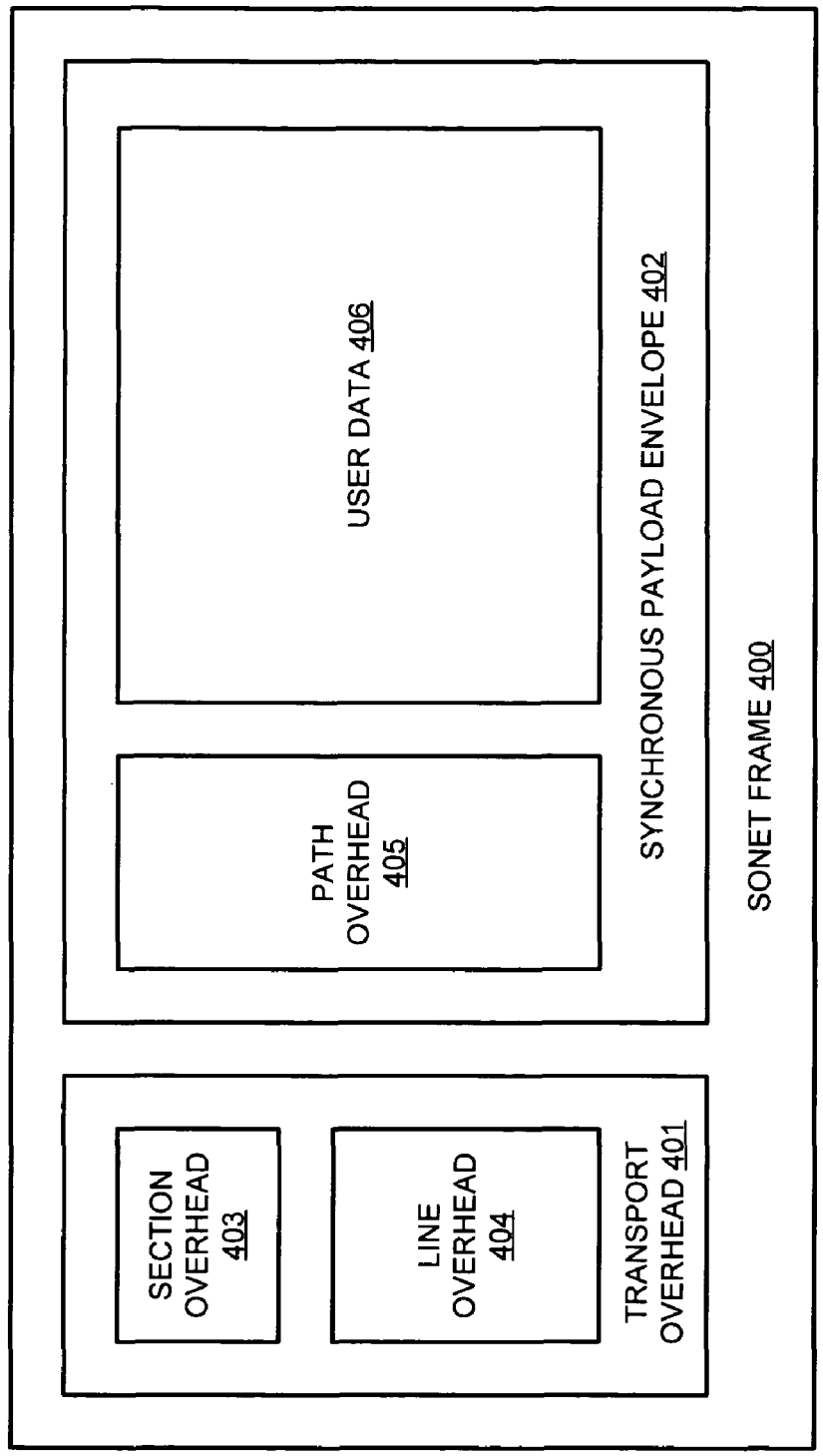
FIG. 4 illustrates a SONET frame in an example of the invention.

FIG. 4 illustrates SONET frame 400 in an example of the invention. SONET frame 400 represents a SONET frame transferred from communication system 301 to communication system 302 over link 311. Because of line and section overhead replication, SONET frame 400 also represents the corresponding SONET frame transferred from communication system 302 back to communication system 301 over link 316. SONET frame 400 includes transport overhead 401 and synchronous payload envelope 402. Transport overhead 401 includes section overhead 403 and line overhead 404. Synchronous payload envelope 402 includes path overhead 405 and user data 406.

Figure 5:
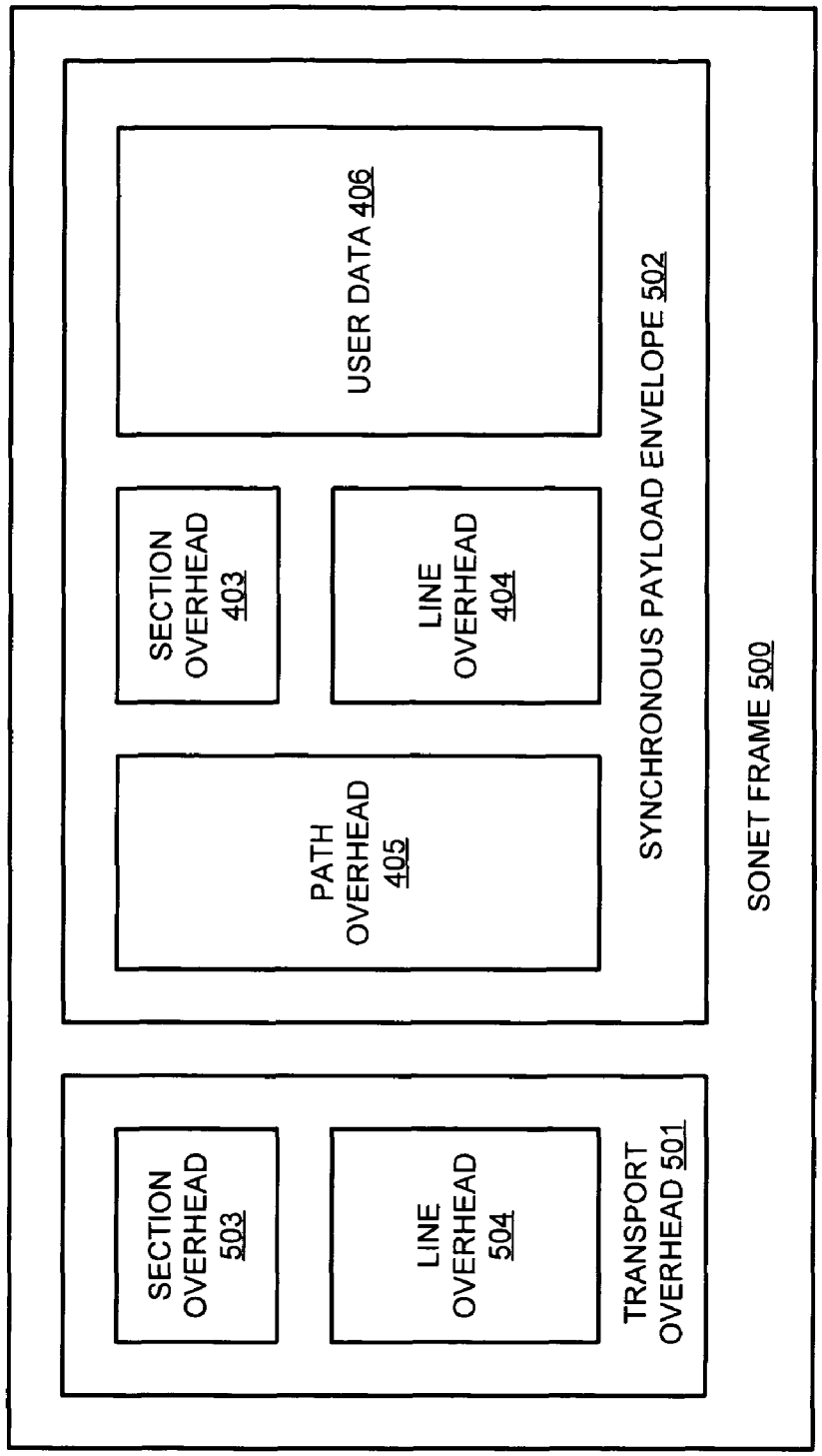
FIG. 5 illustrates a SONET frame in an example of the invention.

FIG. 5 illustrates SONET frame 500 in an example of the invention. SONET frame 500 represents the corresponding SONET frames transferred between nodes 303-307 (although section overhead 503 would still change from node to node). SONET frame 500 includes transport overhead 501 and synchronous payload envelope 502. Transport overhead 501 includes section overhead 503 and line overhead 504. Note that transport overhead 501 in frame 500 has different line and section overhead from transport overhead 401 of frame 400. Synchronous payload envelope 502 includes section overhead 403, line overhead 404, path overhead 405, and user data 406. Note that synchronous payload envelope 502 of frame 500 includes original section overhead 403 and line overhead 404 that was terminated by LTE node 303.

LTE node 307 would terminate section overhead 503 and line overhead 504 of SONET frame 500. LTE node 306 would retrieve original section overhead 403 and line overhead 404 from synchronous payload envelope 502 and place original section overhead 403 and line overhead 404 back in the transport overhead to replicate SONET frame 400 for transfer to communication network 301.

For clarity, this example shows that section overhead 403 and line overhead 404 are transferred between LTE nodes 303 and 307 in the same synchronous payload envelope 502 that also transfers path overhead 405 and user data 406. Alternatively, section overhead 403 and line overhead 404 could be transferred between LTE nodes 303 and 307 using other techniques, such as: 1) in available space in the SONET overhead, 2) in a different synchronous payload envelope, 3) over a different SONET path, 4) over a different SONET connection, or 5) over a non-SONET connection.

As viewed by communication system 301, communication system 302 does not appear to alter the section and line overhead of the SONET frames transferred from link 311 to link 316. Thus, communication system 302 appears as an optical fiber to communication system 301. This fiber-like appearance can be very desirable to communication system 301, especially if communication system 302 is being used to close a SONET ring. Advantageously, communication system 302 can provide this fiber-like appearance without installing a direct optical fiber from link 311 to link 316.

In the context of the invention, the term "section overhead" means all of the bytes in the section overhead or only a portion of the bytes in the section overhead. In the context of the invention, the term "line overhead" means all of the bytes in the line overhead or only a portion of the bytes in the line overhead. In the context of the invention, the term "path overhead" means all of the bytes in the path overhead or only a portion of the bytes in the path overhead. Thus, the term "overhead" requires at least a portion of the bytes for that type of overhead, but does not require all of the bytes for that type of overhead.

Example #2

Figure 6:
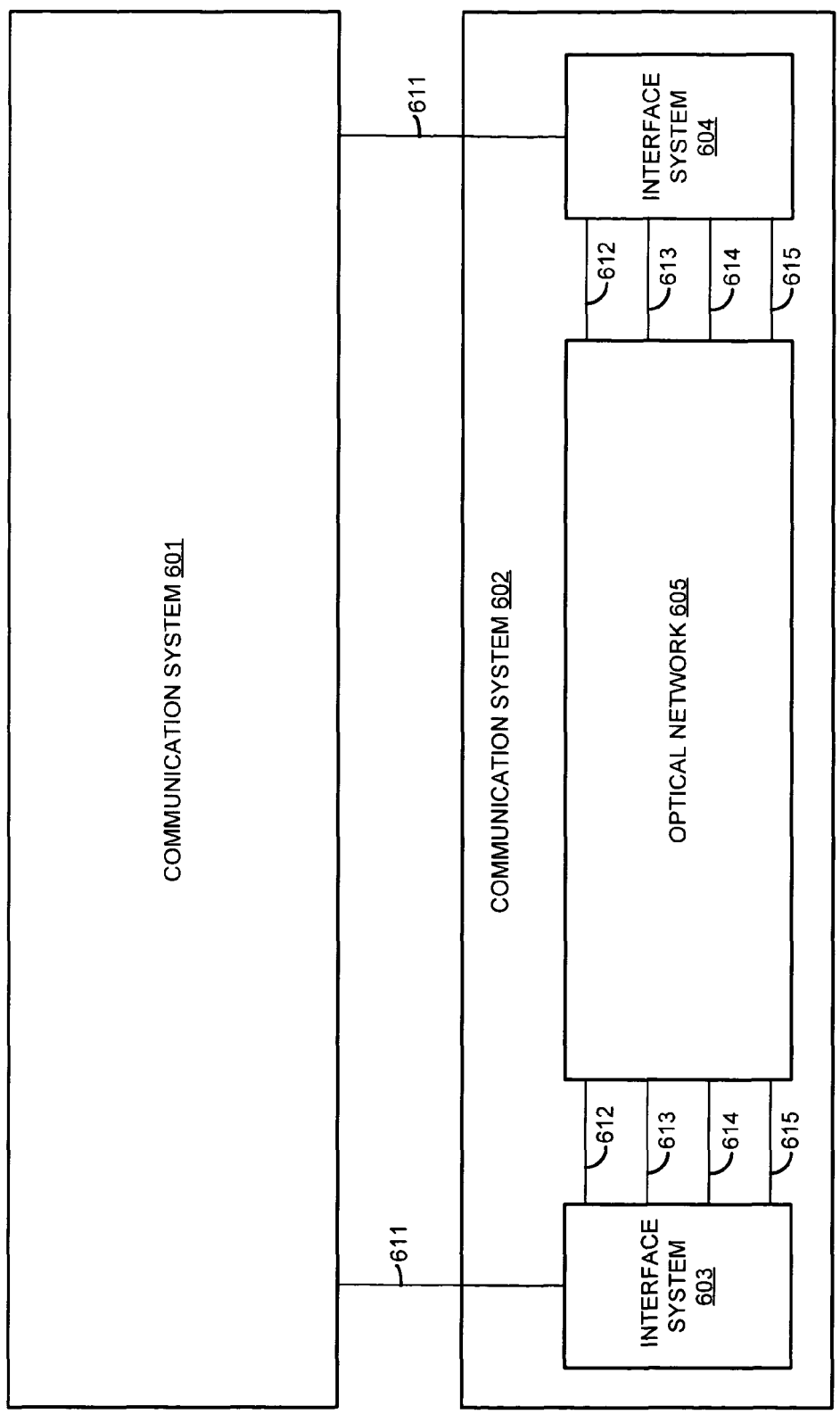
FIG. 6 illustrates a communication system in an example of the invention.

FIG. 6 illustrates communication system 602 in an example of the invention. Communication system 602 includes interface systems 603-604 and optical network 605. Interface system 603 is coupled to communication system 601 by optical wavelength 611. Interface system 603 is coupled to optical network 605 by optical wavelengths 612-615. Optical network 605 is coupled to interface system 604 by optical wavelengths 612-615. Interface system 604 is coupled to communication system 601 by optical wavelength 611.

Optical wavelengths 611-615 traverse optical fibers (not shown). Optical wavelength 611 could be the same or different from optical wavelengths 612-615, but optical wavelengths 612-615 are different from one another.

Interface systems 603-604 could be comprised of SONET ADM equipment, optical cross-connect equipment, and Wavelength Division Multiplexing (WDM) equipment. Optical network 605 could be comprised of optical fibers, WDM equipment, optical cross-connect equipment, optical repeaters, and SONET equipment.

Interface system 603 receives a SONET signal over optical wavelength 611. The SONET signal includes section overhead and line overhead in the transport overhead, and includes path overhead and user data in the payload. In response, interface system 603 transfers the section overhead, line overhead, path overhead, and user data to optical network 605 over optical wavelength 612.

Optical network 605 receives the section overhead, line overhead, path overhead, and user data from interface system 603 over optical wavelength 612. Optical network 605 transfers the section overhead, line overhead, path overhead, and user data to interface system 603 over optical wavelength 612.

Interface system 604 receives the section overhead, line overhead, path overhead, and user data from optical network 605 over optical wavelength 612. Note that this is the same overhead and data received by interface system 603. In response, interface system 604 regenerates the SONET signal including the section and line overhead in the transport overhead and including the path overhead and user data in the payload. Interface system transfers the regenerated SONET signal to communication system 601 over optical wavelength 611.

In some variations, interface system 603 receives the SONET signal over single optical wavelength 611 and transfers the section overhead, line overhead, path overhead, and user data to optical network 605 in parallel over multiple optical wavelengths 612-615. Optical network 605 transfers the section overhead, line overhead, path overhead, and user data to interface system 604 in parallel over multiple optical wavelengths 612-615. Interface system 604 receives the section overhead, line overhead, path overhead, and user data in parallel over multiple optical wavelengths 612-615. Interface system 604 transfers the regenerated SONET signal over single optical wavelength 611. Advantageously, this variation allows communication system 602 to use lower speed links to close a high-speed SONET ring. For example, optical wavelength 611 could be operating at 10 Gigabits/second, and optical wavelengths 612-615 could each be operating at 2.5 Gigabits/second. Thus, communication system 602 appears as a single high-speed optical wavelength to communication system 601, but communication system 602 is able to use its LTEs, STEs, and lower speed optical wavelengths.

In some variations, communication system 601 is part of a first communication service provider, and communication system 602 is part of a second communication service provider. The first communication service provider transfers the SONET signal to interface system 603 and receives the regenerated SONET signal from interface system 604. Communication system 602 in the second communication service provider may close a SONET ring for the first communication service provider.

In some variations, communication system 601 is a customer of a communication service provider represented by communication system 602. The customer transfers the SONET signal to interface system 603 and receives the regenerated SONET signal from interface system 604. Communication system 602 in the communication service provider may close a SONET ring for the customer.

In some variations, interface system 603 transfers the path overhead and the user data by transferring a new SONET signal that includes new section overhead and new line overhead in the transport overhead and that includes the path overhead and the user data in the payload.

In some variations, interface system 603 transfers the section overhead and the line overhead by transferring a new SONET signal that includes the section overhead and the line overhead in the payload.

In some variations, interface system 204 receives the path overhead and user data by receiving a SONET signal that includes new section overhead and line overhead in the transport overhead and that includes the path overhead and user data in the payload.

In some variations, interface system 204 receives the original section overhead and line overhead by receiving a SONET signal that includes the original section overhead and line overhead in the payload.

In some variations, optical wavelengths 612-615 could be the same, but physically separated on different fibers.

The invention claimed is:

1. A communication system comprising:
a first interface system configured to receive over a single optical wavelength a first Synchronous Optical Network (SONET) signal including first section overhead and first line overhead in a first transport overhead and including path overhead and user data in a first payload, and in response, to transfer in parallel over multiple optical wavelengths the first section overhead, the first line overhead, the path overhead, and the user data; and
a second interface system configured to receive the first section overhead, the first line overhead, the path overhead, and the user data, and in response, to regenerate the first SONET signal including the first section overhead and the first line overhead in the first transport overhead and including the path overhead and the user data in the first payload, and to transfer the regenerated first SONET signal.

2. The communication system of claim 1 further comprising an optical network configured to receive the first section overhead, the first line overhead, the path overhead, and the user data from the first interface system and to transfer the first section overhead, the first line overhead, the path overhead, and the user data to the second interface system.

3. The communication system of claim 2 wherein a first communication service provider transfers the first SONET signal to the first interface system and receives the regenerated first SONET signal from the second interface system, and wherein the communication system is part of a second communication service provider.

4. The communication system of claim 3 wherein the communication system in the second communication service provider closes a SONET ring for the first communication service provider.

5. The communication system of claim 1 wherein the first interface system is configured to transfer the path overhead and the user data by transferring a second SONET signal including second section overhead and second line overhead in a second transport overhead and including the path overhead and the user data in a second payload.

6. The communication system of claim 1 wherein the first interface system is configured to transfer the first section overhead and the first line overhead by transferring a second SONET signal including the first section overhead and the first line overhead in a second payload.

7. The communication system of claim 1 wherein the second interface system is configured to receive the first section overhead, the first line overhead, the path overhead, and the user data in parallel over the multiple optical wavelengths and to transfer the regenerated first SONET signal over the single optical wavelength.

8. The communication system of claim 1 wherein the second interface system is configured to receive the path overhead and the user data by receiving a second SONET signal including second section overhead and second line overhead in a second transport overhead and including the path overhead and the user data in a second payload.

9. The communication system of claim 1 wherein the second interface system is configured to receive the first section overhead and the first line overhead by receiving a second SONET signal including the first section overhead and the first line overhead in a second payload.

10. A method of operating a communication system comprising:
in a first interface system, receiving a first Synchronous Optical Network (SONET) signal over a single optical wavelength including first section overhead and first line overhead in a first transport overhead and including path overhead and user data in a first payload, and in response, transferring the first section overhead, the first line overhead, the path overhead, and the user data in parallel over multiple optical wavelengths; and
in a second interface system, receiving the first section overhead, the first line overhead, the path overhead, and the user data, and in response, regenerating the first SONET signal including the first section overhead and the first line overhead in the first transport overhead and including the path overhead and the user data in the first payload, and to transferring the regenerated first SONET signal.

11. The method of claim 10 further comprising, in an optical network, receiving the first section overhead, the first line overhead, the path overhead, and the user data from the first interface system and transferring the first section overhead, the first line overhead, the path overhead, and the user data to the second interface system.

12. The method of claim 11 wherein a first communication service provider transfers the first SONET signal to the first interface system and receives the regenerated first SONET signal from the second interface system, and wherein the communication system is part of a second communication service provider.

13. The method of claim 12 wherein, in the second communication service provider, receiving the first SONET signal and transferring the regenerated first SONET signal comprises closing a SONET ring for the first communication service provider.

14. The method of claim 10 wherein, in the first interface system, transferring the path overhead and the user data comprises transferring a second SONET signal including second section overhead and second line overhead in a second transport overhead and including the path overhead and the user data in a second payload.

15. The method of claim 10 wherein, in the first interface system, transferring the first section overhead and the first line overhead comprises transferring a second SONET signal including the first section overhead and the first line overhead in a second payload.

16. The method of claim 10 wherein, in the second interface system, receiving the first section overhead, the first line overhead, the path overhead, and the user data and transferring the regenerated first SONET signal comprises receiving the first section overhead, the first line overhead, the path overhead, and the user data in parallel over the multiple optical wavelengths and transferring the regenerated first SONET signal over the single optical wavelength.

17. The method of claim 10 wherein, in the second interface system, receiving the path overhead and the user data comprises receiving a second SONET signal including second section overhead and second line overhead in a second transport overhead and including the path overhead and the user data in a second payload.

18. The method of claim 10 wherein, in the second interface system, receiving the first section overhead and the first line overhead comprises receiving a second SONET signal including the first section overhead and the first line overhead in a second payload.

* * * * *

UNITED STATES PATENT AND TRADEMARK OFFICE
CERTIFICATE OF CORRECTION

| | | |
|---|---|---|
| PATENT NO. | : 7,643,500 B1 | Page 1 of 1 |
| APPLICATION NO. | : 10/647936 | |
| DATED | : January 5, 2010 | |
| INVENTOR(S) | : Charles W. Norman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1866 days.

Signed and Sealed this

Sixteenth Day of November, 2010

David J. Kappos
*Director of the United States Patent and Trademark Office*